Nov. 12, 1968   H. ROSENBERG   3,411,027
PERMANENT MAGNET EXCITED ELECTRIC MACHINE
Filed July 8, 1965   5 Sheets-Sheet 1
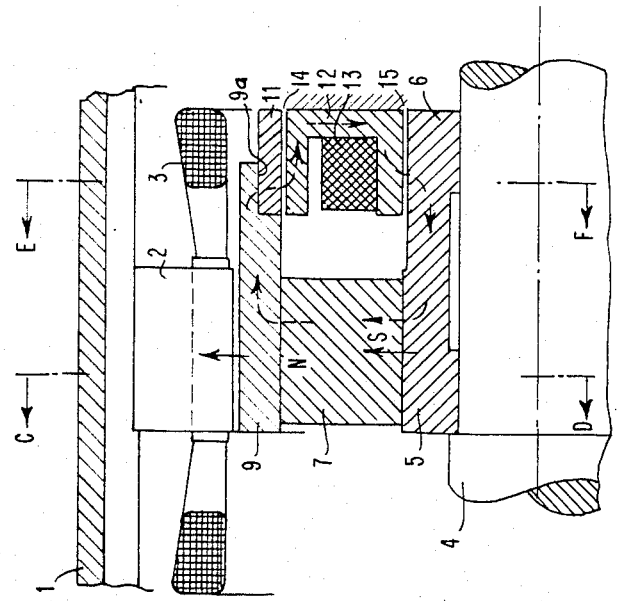
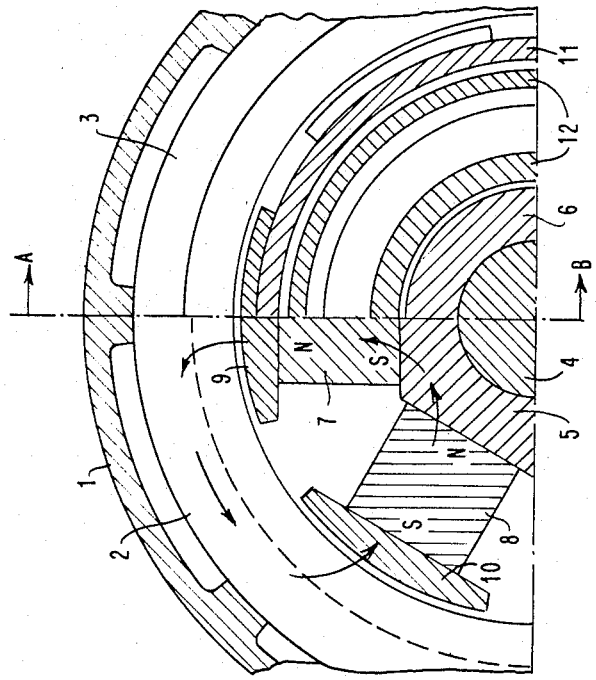

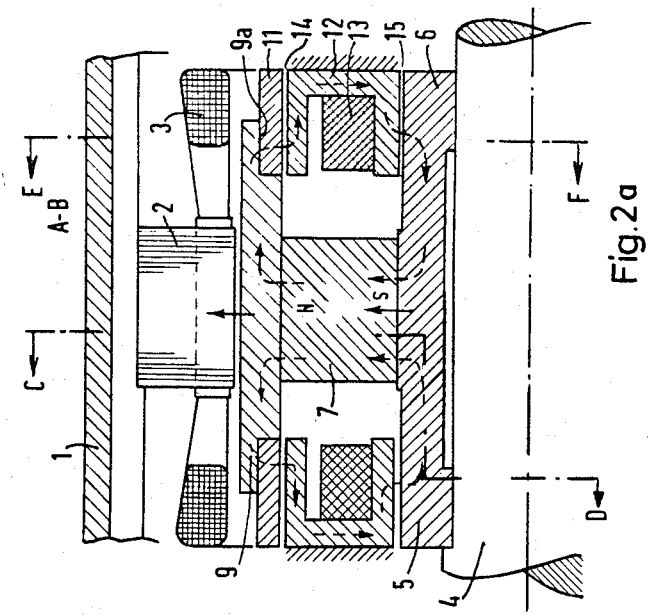
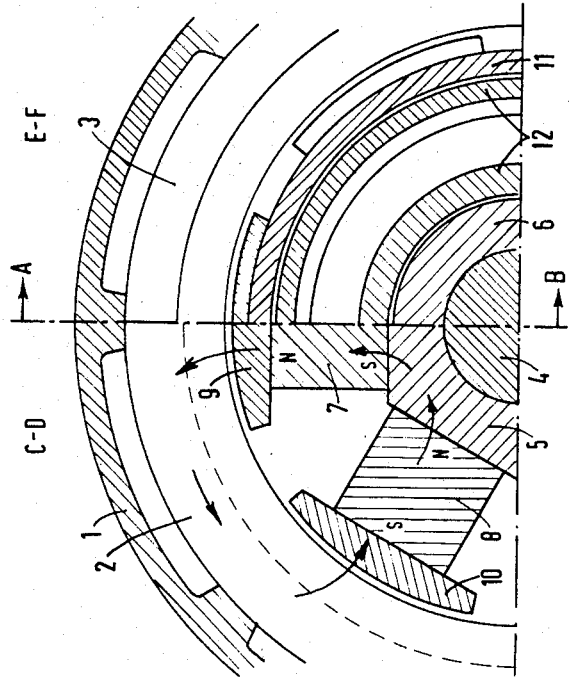

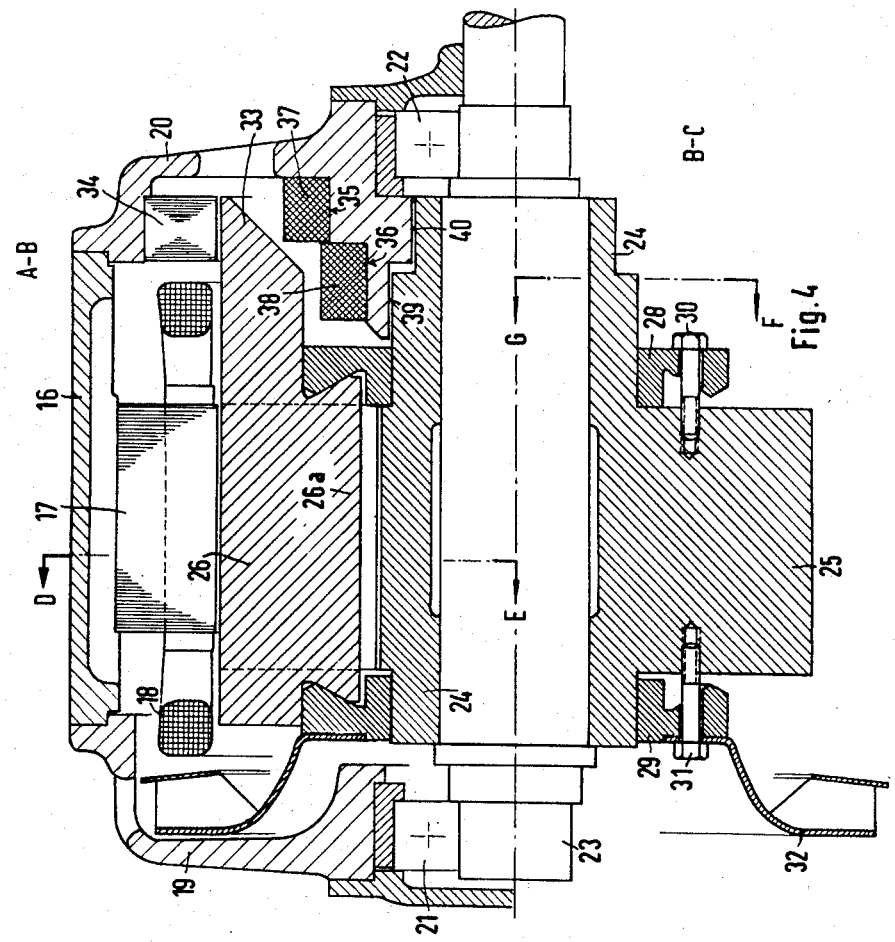
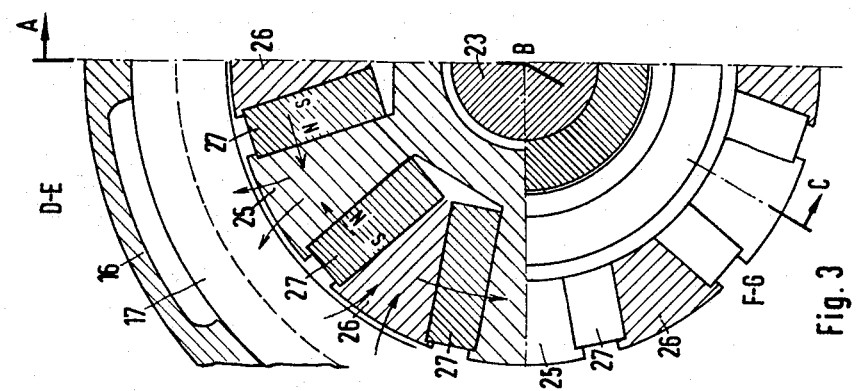

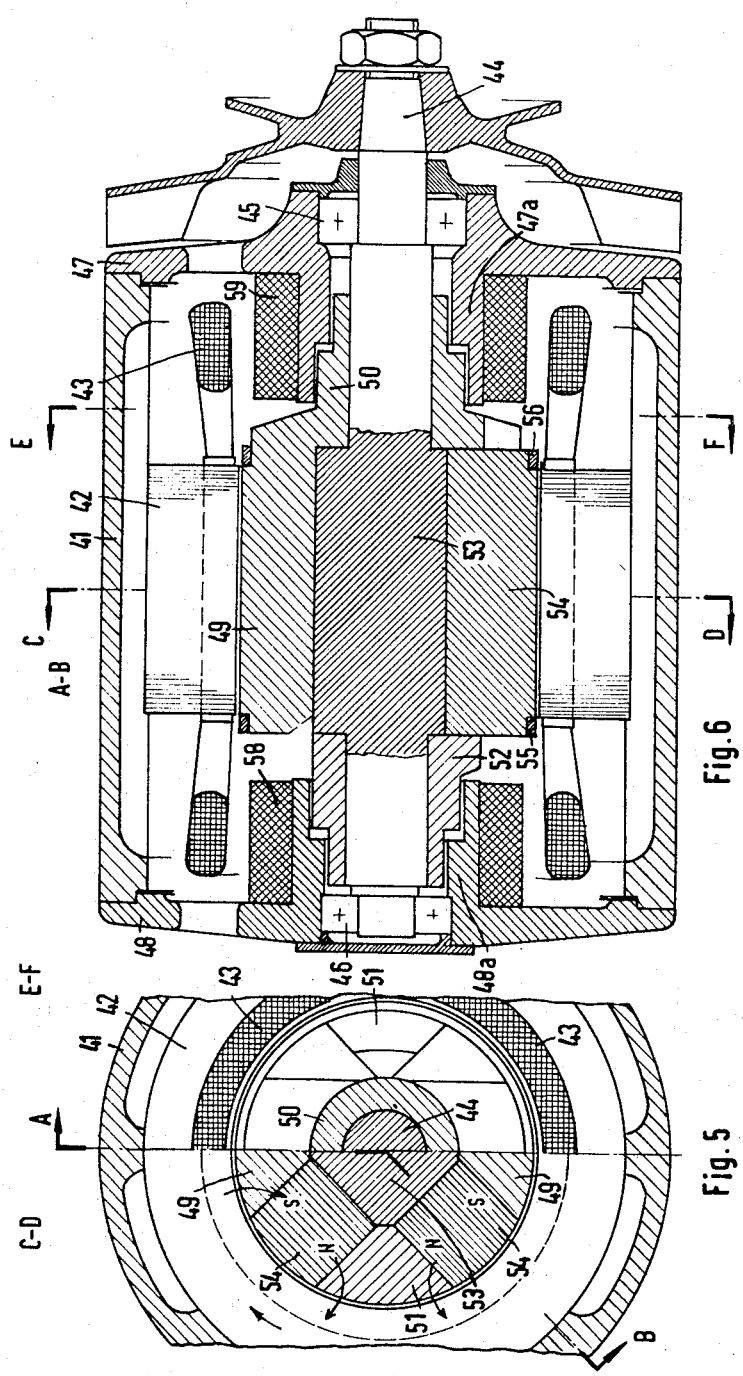

United States Patent Office 3,411,027
Patented Nov. 12, 1968

3,411,027
PERMANENT MAGNET EXCITED
ELECTRIC MACHINE
Heinz Rosenberg, Bad Neustadt, Germany, assignor to
Siemens Aktiengesellschaft, Munich, Germany
Filed July 8, 1965, Ser. No. 470,401
Claims priority, application Germany, July 16, 1964,
S 92,076
14 Claims. (Cl. 310—181)

ABSTRACT OF THE DISCLOSURE

An electric machine with a permanent magnet rotor in which the useful flux, and hence the generated voltage or speed of the machine, is controllable by varying the direct voltage applied to the excitation winding of a magnetizable structure joined with the stator in magnetic shunt relation thereto. The controllable magnetomotive force of the shunt becomes additively or subtractively superimposed upon the magnetomotive force of the rotor magnets and thus increases or decreases the resultant useful flux, depending upon the polarity and magnitude of the shunt excitation voltage.

---

My invention relates to electric machines. More particularly, it relates to an electric machine of the type in which one or a plurality of permanent magnets in the rotor of the machine induces currents in the stator windings.

Known electric machines such as electric generators and motors of the abovementioned type present the advantages that they are relatively simple in design, do not require slip rings, have substantially no excitation losses and are capable of being constructed in relatively small over-all dimensions and low weights if a high grade magnetic material is employed for the magnets therein.

Such electric machines, however, present the disadvantage that they can be controlled only at a considerable expenditure with regard to voltage and velocity. Thus, in known generators of this type, one technique, for example, for regulating voltage is to utilize a controlled resistance in the power circuit. Another projected technique for the control of voltage and velocity in permanent magnet excited electric machines has been to utilize the available magnetic flux, in this connection, by rendering it variable by premagnetization. To this end, the stationary armature of the machine is provided with a direct current carrying ring winding through which a variable tangential premagnetization is imparted to the core of such armature in order to control the available magnetic flux. In the latter type of control arrangement, it has been found to be particularly advantageous for the direct-current carrying ring winding which effects the premagnetization to be, at least, partially combined with the induced current operating winding. With such arrangement, there is enabled a comparatively simply constructed electric device in which there is enabled the regulation of the available magnetic flux to control the voltage generated when the device is used as a generator or its velocity when it is employed as a motor.

It is an important object of this invention to provide an improved permanent magnet excited type electric machine in which control functions therefor are effected by controlling the available magnetic flux.

This object is achieved by providing at least one magnetic shunt path which lies in parallel with the paths of the useful flux of the stator relative to at least a portion of the rotor magnets. Such path passes across at least one stationary direct current operated control winding whose excitation is variable to enable the control of the available magnetic flux, such control being effected by the influencing of the magnetic flux in the aforesaid shunt path. In accordance with the size and the direction of the excitation produced by the direct current operated control or control windings, an arbitrarily variable flux is added to or subtracted from the total magnetic flux of the permanent magnets and the available flux which permeates the stator is thereby strengthened or weakened.

It is another object to provide a permanent magnet excited electric machine in accordance with the preceding object in which the control of the available or utilizable magnetic flux can be effected over the entire operating range or in a selected portion thereof.

It is a further object to provide a permanent magnet excited electric machine in accordance with the preceding objects in which the excitation of the direct current operated control winding or windings acts in the same direction under all operating conditions, i.e., the addition to or subtraction from the flux of the permanent magnets with the consequent corresponding strengthening and weakening of the utilizable flux permeating the stator, and in which the magnitude of the aforementioned excitation is changed only between zero and a maximum value.

It is still a further object to provide a permanent magnet excited electric machine in accordance with the preceding objects in which the control excitation has to be passed from a negative, i.e., field weakening, maximum value through zero to a positive, i.e., field strengthening, maximum value to cover the entire power and speed range of the machine whereby there is enabled an improvement in saving with regard to volume, weight, and expense of construction of the machine, and wherein control performance is appreciably improved.

Generally speaking and in accordance with the invention, there is provided in an electric machine comprising a rotor comprising a plurality of permanent magnets, a stator and first winding means on the stator responsive to the magnetic flux produced by the magnets for inducing currents in the first winding means, a shunt path in parallel with the flux paths through the stator comprising a stationary member consisting of a magnetically conductive material physically disposed to provide shunt magnetic flux paths in parallel with the path of flux through the magnets and stator. There are included second winding means on the stationary member adapted to be connected to a variable unidirectional potential source to be variably excited thereby and disposed to be permeated by the magnetic flux in the shunt paths. The value of and the direction of the potential applied to the second winding means determines the quantity of the magnetic flux in the shunt paths and the direction thereof for adding to and subtracting from the flux through the stator.

The foregoing and more specific objects and features of my invention will be apparent from, and will be mentioned in the following description of permanent magnet excited electric machines according to the invention shown by way of example in the accompanying drawing wherein:

FIG. 1 is a cross-sectional view in two planes, taken along lines C–D and E–F of FIG. 2;

FIG. 1a is a cross-sectional view in two planes taken along lines C–D and E–F of FIG. 2a;

FIG. 2 is a longitudinal section, taken along lines A–B of FIG. 1, through the operating portion of an illustrative embodiment of an electric machine of the leg pole type constructed in accordance with the principles of the present invention;

FIG. 2a is a longitudinal section, taken along the lines A–B of FIG. 1a and is a modification of the embodiment of FIG. 2;

FIG. 3 is a cross-sectional view in two planes taken along lines D–E and F–G of FIG. 4;

FIG. 4 is a longitudinal section of another illustrative embodiment of an electric machine according to the invention through the pertinent operating portion thereof, taken along lines A–B in FIG. 3;

FIG. 5 is a cross-sectional view in two planes, taken along lines C–D and E–F of FIG. 6;

FIG. 6 is a longitudinal section through the pertinent operating portion of still another illustrative embodiment of an electric machine of the claw-pole type constructed in accordance with the principles of the invention and taken along lines A–B of FIG. 5;

Figure 8:
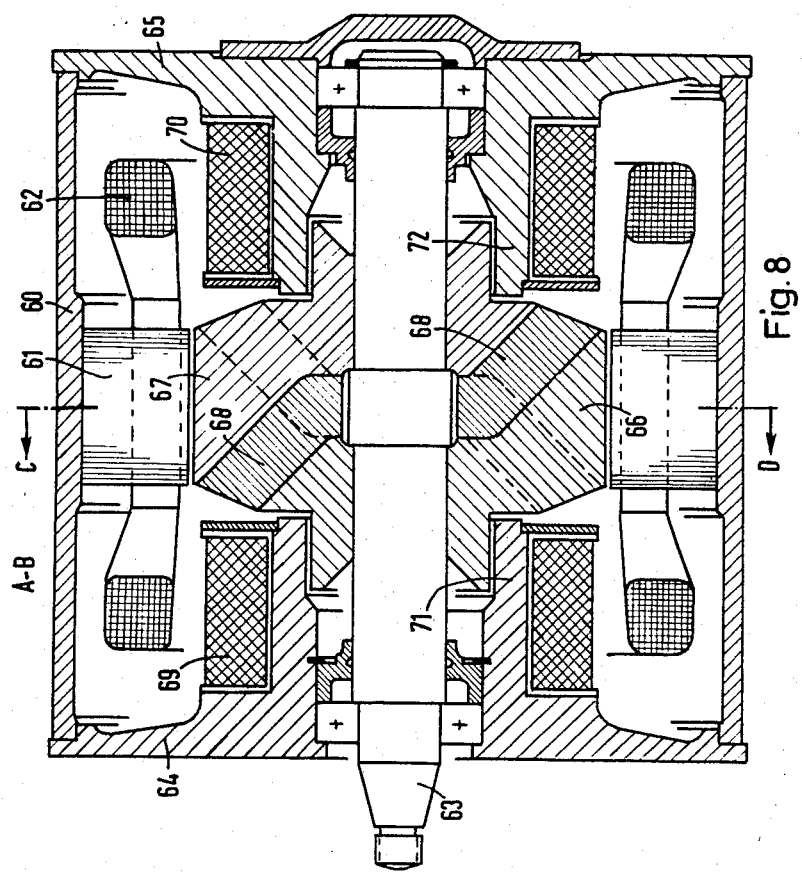
FIG. 8 is a longitudinal section of another illustrative embodiment of an electric machine of the claw-pole type constructed according to the invention and taken along lines A–B of FIG. 7.

Referring now to FIGS. 1 and 2, wherein there is shown a first illustrative embodiment of a permanent magnetic excited electric machine constructed in accordance with the principles of the invention, a laminated stator 2 having a winding 3 therearound is contained in a housing 1. The shaft 4 of the machine, suitably comprising a non-magnetic material, is journaled in bearing members (not shown). A hub 5 having a cylindrical portion 6 of magnetically conductive material is suitably affixed to shaft 4. In this embodiment, hub 5 has a hexagonal periphery, to correspond to an arrangment where six poles are included, and carries on its peripheral sides, permanent magnets such as 7 and 8 which have the configuration of magnet pole legs constructed in the generally employed known manner. The permanent magnets are disposed such that the pole pieces 9 and 10 of adjacent magnets 7 and 8, respectively, for example, function as north-magnetic and south-magnetic poles. Thus, the path of the magnetic flux in a pair of adjacent pole legs is as indicated by arrows in the figures.

In the embodiment shown in FIGS. 1 and 2, the pole pieces of the north magnetic poles, such as pole pieces 9, extend at one side thereof to be interconnected with a magnetically conductive hollow cylindrical member 11 which is concentrically disposed with respect to shaft 4. Member 11 is mounted at and suitably affixed to recesses 9a of all of the north magnetic pole pieces such as pole piece 9.

Also disposed concentrically with respect to shaft 4 and intermediate cylindrical portion 6 of hub 5 and hollow cylinder 11 is a flux yoke 12 comprising a magnetically conductive material. As shown in FIG. 2, in the embodiment of FIGS. 1 and 2, such yoke 12 may suitably be an annular structure having a U-shaped cross-section. Yoke 12 carries a stationary winding 13, i.e., a control winding adapted to be connected to a variable unidirectional potential source (not shown) which is linked with the magnetic flux emanating from the extended pole piece 9, the latter flux passing over an air gap 14 between yoke 12 and member 11, through yoke 12, and through an air gap 15 between yoke 12 and cylindrical portion 6, and hub 5 of the rotor. With this arrangement, a magnetic shunt path, i.e., a magnetic control circuit is provided in parallel with the flux paths of the utilizable flux of the positive poles of the permanent magnets, the course of such shunt path being shown in FIG. 2 by dashed-line arrows.

The greater the excitation provided in stationary winding 13 of yoke 12 the greater is the partial flux shunted from the total flux and passing through the shunt path. Consequently, the utilizable magnetic flux permeating the stator is weakened. Such increasing of excitation is, of course, predicated on the necessity of the current in winding 13 being in a direction to provide the flow of flux in the shunt path in the direction as shown in FIG. 2 by the dashed line arrows. When the excitation direction in winding 13 is reversed, the utilizable flux permeating the stator is strengthened with a corresponding weakening of the shunted partial magnetic flux. With a further progressive increase in the reversed control excitation in winding 13, the magnitude of shunt flux passes through the zero point and correspondingly increases in the opposite direction, forming in addition with the utilizable fluxes provided the permanent magnets, the utilizable magnetic fluxes permeating the stator.

The embodiment of FIGS. 1 and 2 shows the pole pieces of one polarity axially extended at one side thereof whereas the pole pieces of the opposite polarity are not so extended. It is to be realized that, in accordance with the principles of the invention, the pole pieces of a polarity may be extended from both opposite sides, in which construction, a yoke 12 carrying a control winding 13 is provided at each side, as shown in FIGS. 1a and 2a. In the arrangement of FIGS. 1a and 2a, there is provided an electric machine whose active length is doubled thereby since the control flux is equally distributed over the two sides. In such two-sided control excitation arrangements, such control excitations are preferably chosen to be of equal magnitude whereby any magnetic effects the control excitations may have on the shaft are mutually cancelled. Thus, with the two-sided arrangement of FIGS. 1a and 2a, there accrues the advantage that there no longer exist therein any causes for generating parasitic bearing currents which produce a magnetic flux through the shaft, the bearing members and the housing of the machine. Consequently, it is not necessary to insure that at least one of the bearing members, shaft and housing is made of nonmagnetic material.

The embodiment shown in FIGS. 1 and 2 may be modified to provide a magnetically symmetrical electrical machine structure by extending the pole pieces of one polarity from one side and extending the pole pieces of the other polarity from the opposite side. Yokes such as a yoke 12 carrying a control winding 13 are provided respectively for each set of like polarity pole pieces at their extended sides (such arrangement is analogous to those shown in FIGS. 5, 6 and 7, 8 respectively as are described hereinbelow). With this arrangement, since the control flux source from one side comprises the magnets of one polarity and the control flux source from the opposite side comprises the magnets of the other polarity, each control winding has to provide only half of the control excitation.

In the embodiment shown in FIGS. 1 and 2, the like polarity extended pole pieces 9 are interconnected with hollow cylindrical member 11. Such extended pole pieces can act directly on a stationary yoke flux. However, in such arrangement, it would be necessary for the portion of the flux yoke disposed in opposition to, i.e., facing the extended pole pieces, to be laminated.

In FIGS. 3 and 4, there is shown a second illustrative embodiment of an electric machine constructed in accordance with the principles of the invention, in which the active volume is particularly efficiently employed. In this embodiment, a laminated stator 17 having a winding 18 is contained in a housing 16. A shaft 23 is journaled in bearings 21 and 22 in bearing structures 19 and 20 which are disposed to bear against the sides of housing 16. Affixed to shaft 23 is a structure 25 comprising a magnetic material. The structure 25 comprises spaced radially disposed pole portions extending therefrom and effectively has in cross-section a stellate configuration. All of the pole portions of structure 25 have a like magnetic polarity. Pole pieces 26, all having a magnetic polarity opposite to that of the pole portions of stellate structure 25 and suitably of substantially wedge-shaped configuration, are respectively disposed between and angularly spaced from adjacent pole portions of structure 25. Permanent magnets 27 (with their respective magnetic polarities legended thereon in the figures) are disposed in the gaps between pole pieces 26 and the pole portions of structure 25. Pole pieces 26 are provided with dovetailed extensions 26a as shown in FIG. 4 for the affixing thereof by means of correspondingly shaped annular members 28 and 29 carried by hub 24. The annular members 28 and 29 are suitably affixed to structure 25 by screws 30 and 31 and comprise a non-magnetic material. Screws 31 also function to affix a ventilator 32 to annular member 29.

To provide a magnetic shunt in accordance with the principles of the invention, the pole portions 26 of structure 25 are extended in the axial direction in extensions 33. The latter extensions 33 coact magnetically over an air gap with a laminated ring 34 suitably comprising iron, which is suitably affixed in bearing structure or shield 20. Shield 20, comprising a magnetically conductive material, receives bearing 22 and carries two control windings 37 and 38 in hollow cylindrical extensions 35 and 36 respectively. The configurations of extensions 35 and 36 are chosen such that they define with extended hub 24, cylindrical air gaps 39 and 40. Control windings 37 and 38, in effect, are the two portions of a split control winding and such splitting enables efficient space utilization and it is, of course, to be realized that in their stead, a single control winding may be utilized.

The embodiment shown in FIGS. 3 and 4 functions in substantially the same manner as that shown in FIGS. 1 and 2. Similarly, the construction of the embodiment of FIGS. 3 and 4 may be modified whereby pole pieces 26 are extended in the axial direction from both of the opposite sides thereof whereby ring 34, hollow cylindrical extensions 35 and 36, and control windings 37 and 38 would be disposed at both like-shaped bearing structures. With the latter arrangement, similar to the arrangement resulting from a corresponding modification in the construction of the embodiment of FIGS. 1 and 2, as shown in FIGS. 1a and 2a, the control magnetic flux would be divided into two halves and an increasing of the control range of the electric machine would be enabled.

Permanent magnets 27, magnetized essentially in the tangential direction, and inserted between the adjacent pole portions of structure 25 and pole pieces 26, preferably completely fill in the pole clearances. Such arrangement is particularly suitable where the magnets which are utilized are ferrite magnets since the cross-section of such a magnet can be chosen to be larger than the cross-section of the air gap, and there can be readily provided at the same time only relatively small magnet lengths in the direction of the lines of force.

In the embodiment shown in FIGS. 3 and 4, there is effected magnetic utilization of the pole clearance volume with the simultaneous suppression of stray pole dispersion in the active rotor portion, and advantageous utilization thereof is attained. The suppression of stray dispersion can be permitted where magnetically isotropic ferrites are used since, in the latter, an irreversible demagnetization caused by short circuits or rotor construction substantially does not occur. In the case where there are utilized ferrites of higher magnetic quality and with anisotropic properties, protection from short circuits can be provided, for example, with a magnetic shunt in accordance with the principles of the invention.

In FIGS. 5 and 6, wherein there is shown an application of the invention to a machine of the claw-pole type, a laminated stator 42 having a winding 43 is contained within a housing 41 which comprises a magnetically conductive material. A shaft 44 is rotatably arranged in bearing structures or shields 47 and 48. Shaft 44 is chosen to comprise a magnetically non-conductive material but bearing structures 47 and 48 comprise a magnetically conductive material, all of the magnetic pole legs have the same configuration and are axially disposed. The embodiment of FIGS. 5 and 6, for convenience of description, is shown as comprising four magnetic pole legs arranged in quadrature. Pole legs 49 are chosen to be of one type polarity and are disposed in diametrically opposing relationship relative to the axis of shaft 44 and terminate in a cylindrical hub 50 wherein the magnetic fluxes from the individual pole legs are combined. The pole legs 51 which are of the polarity opposite to that of pole legs 49 also are disposed in diametrically opposing relationship respectively intermediate pole legs 49 and terminate in a cylindrical hub 52. Both of hubs 50 and 52 are securely affixed to shaft 44 by suitable means. The central portion of shaft 44 is chosen to have substantially the configuration of a square with beveled corners, pole legs 49 and 51 bearing against these corners. Permanent magnets 54 are provided intermediate poles 49 and 51 as shown, their polarities being legended in the figures. In FIG. 5, there is shown the path and direction of the magnetic flux by suitable arrows. In the construction of the device shown in FIGS. 5 and 6, the permanent magnets are preferably prefabricated, inserted into the respective spaces between pole legs 49 and 51 and affixed in position by gluing, for example. They are suitably securely maintained by rings 55 and 56. The magnets are suitably rendered magnetic after their insertion.

To provide in the device of FIGS. 5 and 6, the magnetic shunt according to the invention, bearing structures 47 and 48 are provided with cylindrical extensions 47a and 48a which are coaxial with and positioned around the cylindrical hubs 50 and 52. The extensions 47a and 48a carry control windings 58 and 59. In this device, the control flux path is over the bearing structures 47 and 48 and housing 41 similar to the total flux path in the known claw-type pole machines of the so-called Lundell type.

Figure 7:
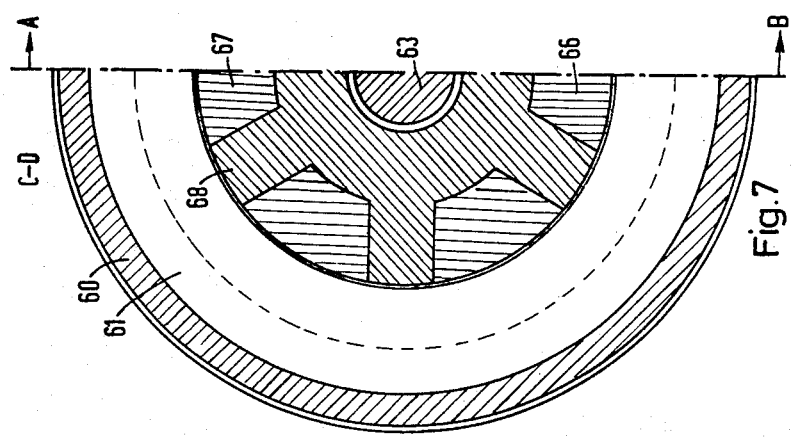
FIG. 7 is a cross-section, taken along lines C–D of FIG. 8.

In FIGS. 7 and 8 wherein there is depicted another embodiment of a claw-type pole electrical machine constructed according to the invention, a laminated stator 61 having a winding 62 is disposed in a housing which comprises a magnetically conductive material. A shaft 63 comprising a non-magnetic material is journaled in bearing structures or shields 64 and 65, structures 64 and 65 being chosen to comprise a magnetically conductive material. Disposed on shaft 63 are claw-type stellate pole members 66 and 67, constructed in the known manner of such members. In contrast to the known Lundell type electric machine, the space between stellate pole member 66 and 67 is filled with a permanent magnet material such as ferrite. The control windings 69 and 70 linked with the magnetic shunt in accordance with the invention are disposed on hollow cylindrical extensions 71 and 72 of bearings 64 and 65 respectively. The machine shown in FIGS. 7 and 8 differs from the one shown in FIGS. 5 and 6 particularly in the design of their respective stellate pole structures, the design of the latter structures in the embodiment depicted in FIGS. 7 and 8 substantially corresponding to that of the known claw-type pole machine, and in the design of the permanent magnets. The entire space defined by the pole legs of the pole structure in the embodiment shown in FIGS. 7 and 8, is filled in with a coherent or sectioned ferrite body 68 which is sintered in molds corresponding in shape to the defined space and, in the assembly of the machine, is glued to the pole legs. The magnetization is preferably performed after such assembly whereby each part of ferrite body 68 automatically is magnetized in the most favorable direction.

In order to simplify and improve ferrite body 68, the portions of the space between the pole legs and between the pole legs and the pole carriers to be employed for the ferrite body 68 can advantageously be constructed with at least approximately parallel and plane or axially symmetrical equally spaced limiting surfaces. Preferably, such parts of this space can be provided with correspondingly dimensioned plane or saucer-shaped ferrite plates which are glued in. The latter arrangement makes possible the use of ferrites with anisotropic properties.

The sinter tolerances of the magnetic ferrite bodies and the casting and machining tolerances of the pole legs, i.e., the claw-poles relative to the surfaces opposing the magnetic ferrite body, although preferably taken into consideration in determining dimensioning, do not present any problems which result in disadvantages. In this latter connection, from the magnetic aspect, a faulty surface contact between the magnets and the pole legs is of little consequence since the reversible permeability of ferrite is almost equal to 1. Actually, from the mechanical aspect, it may even be necessary or, in any case, is advantageous that the brittle ferrite bodies are all on mechanically strained surfaces covered with a practically gapless elastic adhesive layer of adequate thickness.

It will be obvious to those skilled in the art upon studying this disclosure that permanent magnet excited electric machines according to my invention permit a great variety of modifications and hence can be given embodiments other than those particularly illustrated and described herein without departing from the essential features of my invention and within the scope of the claims annexed hereto.

I claim:

1. An electric machine comprising a stator having windings; a rotor having a plurality of permanent magnets for inducing currents in said stator windings; and control means for controlling the useful magnetic flux of said magnets, said control means comprising stationary shunt structure of magnetizable material physically connected with said stator in magnetic shunt relation thereto and a control winding inductively linked with said shunt structure and adapted to be connected in a variable unidirectional excitation voltage for variably magnetizing said shunt structure, whereby the resultant useful flux in the machine is controllable by varying the excitation voltage of said control winding.

2. An electric machine as claimed in claim 1, wherein said shunt structure is magnetized via said control winding to provide flux paths in parallel with the flux paths through selected magnets of said rotor and selected parts of said stator.

3. An electric machine as claimed in claim 1, wherein said shunt structure is on said stator and is coaxial and substantially concentric with said rotor, said shunt structure being magnetized via said control winding to provide flux paths in parallel with the flux paths through selected magnets of said rotor and selected parts of said stator.

4. An electric machine as claimed in claim 3, wherein said rotor comprises a shaft of non-magnetic material, and further comprising a hub of magnetically conductive material closely surrounding said rotor and having a periphery with polygonal sides, said magnets being respectively positioned on the sides of said periphery.

5. An electric machine as claimed in claim 1, wherein said rotor comprises a shaft of non-magnetic material and each of said magnets has an axially extending pole portion thereon, further comprising a hub of magnetically conductive material closely surrounding said rotor and having a periphery with polygonal sides, each of said magnets being positioned on a corresponding side of said periphery, and wherein said control means further comprises first means comprising ferromagnetic material concentrically positioned with said rotor and adjacent said stator and interconnecting the ends of said pole portions, and said stationary shunt structure is concentric with said rotor and is positioned intermediate said first means and said hub, and the ends of said pole pieces, said first means and said stationary shunt structure constitute shunt paths for the flux in selected magnets of said rotor and selected parts of said stator.

6. An electric machine as claimed in claim 5, wherein said shunt structure is a yoke having a U-shaped cross-section and a shunt path passes through said cross-section.

7. An electric machine as caimed in claim 5, wherein the pole portions of one polarity are extended axially in one direction and the pole portions of the other polarity are extended axially in the other direction, the sets of pole portions of different polarities being respectively interconnected by respective first means, and respective shunt structure being positioned intermediate each of said sets of pole portions and said hub.

8. An electric machine as claimed in claim 1, wherein said shunt structure is a yoke having a U-shaped cross-section and a shunt path passes through said cross-section.

9. An electric machine as claimed in claim 1, wherein said rotor comprises a shaft having a hub thereon and a star-shaped magnetic member mounted on said shaft and having a plurality of radially aligned pole parts, each of said pole parts having the same magnetic polarity and each of said magnets being positioned intermediate respective adjacent pole parts, each of said pole parts extending in the axial direction, and wherein said control means comprises a magnetically conductive ring positioned adjacent the ends of the extending pole parts on one side thereof and a hollow cylindrical magnetically conductive member positioned adjacent the other side of said pole parts, and the ends of said pole parts, said ring and said cylindrical member constitute a shunt path for the flux passing through selected parts of said stator from said star-shaped member and said magnets, and said control winding is inductively linked with said cylindrical member.

10. An electric machine as claimed in claim 9, wherein said cylindrical member is a bearing shield and said shaft is journalled in said bearing shield, said bearing shield comprising first and second adjacent hollow cylindrical extensions in step configuration, and wherein said control winding comprises two portions, one of said portions being inductively linked with said first cylindrical extension and the other of said portions being inductively linked with said second cylindrical extension.

11. An electric machine as claimed in claim 9, further comprising bearing shields of magnetically conductive material, and wherein said shaft is of non-magnetically conductive material and is journalled in said bearing shields.

12. An electric machine as claimed in claim 1 further comprising a pair of bearing shields of magnetically conductive material and a bearing in each of said bearing shields, and wherein said rotor comprises a shaft rotatably mounted in the bearings of said bearing shields, a polygonal structure on said shaft extending around said shaft in the area of its center, a first star-shaped member of magnetic material mounted on said shaft bearing against one surface of said polygonal structure and having a plurality of radially extending pole parts of the same polarity extending therefrom and a second star-shaped member of magnetic material mounted on said shaft bearing against the other surface of said polygonal structure and having a plurality of radially extending pole parts of the same polarity extending therefrom, the polarity of said last-mentioned pole parts being opposite that of said first mentioned pole parts, each of said magnets being positioned intermediate respective adjacent opposite polarity pole parts, and wherein said control means comprises cylindrical extensions on said bearing shields, and said bearing shields and said extensions constitute shunt paths for the flux in said stator, and said control winding is inductively linked with said extensions.

13. An electric machine as claimed in claim 12, wherein said magnets are of ferrite material and said pole parts are of claw type.

14. An electric machine as claimed in claim 12, wherein said magnets are of sintered ferrite material and said pole parts are of claw type.

References Cited

UNITED STATES PATENTS

| | | | |
|---|---|---|---|
| 2,802,959 | 8/1957 | Powers | 310—156 |
| 3,072,813 | 1/1963 | Reijnst et al. | 310—156 |

FOREIGN PATENTS

| | | |
|---|---|---|
| 1,238,273 | 7/1960 | France. |

MILTON O. HIRSHFIELD, *Primary Examiner.*

L. L. SMITH, *Assistant Examiner.*